United States Patent [19]
Eto et al.

[11] Patent Number: 5,122,958
[45] Date of Patent: Jun. 16, 1992

[54] APPARATUS FOR CONTROLLING STEERING FORCE PRODUCED BY POWER STEERING SYSTEM

[75] Inventors: Kunihiko Eto; Shiro Takeuchi, both of Toyota; Kazumasa Kodama, Okazaki, all of Japan

[73] Assignee: Toyoda Koki Kabushiki Kaisha, Kariya, Japan

[21] Appl. No.: 552,087

[22] Filed: Jul. 13, 1990

[30] Foreign Application Priority Data

Jul. 31, 1989 [JP]  Japan .................................. 1-200017
Aug. 29, 1989 [JP]  Japan .................................. 1-222340
Sep. 27, 1989 [JP]  Japan .................................. 1-251607

[51] Int. Cl.$^5$ ............................................. B62D 5/04
[52] U.S. Cl. ............................ 364/424.05; 180/79.1; 180/142
[58] Field of Search ................... 364/424.05; 180/79.1, 180/140, 141, 142, 143; 307/10.1, 10.7

[56] References Cited

U.S. PATENT DOCUMENTS

| | | | |
|---|---|---|---|
| 4,730,686 | 3/1988 | Shimizu | 180/79.1 |
| 4,789,041 | 12/1988 | Takeshima et al. | 364/424.05 |
| 4,800,975 | 1/1989 | Oshita et al. | 180/79.1 |
| 4,834,203 | 5/1989 | Takahashi et al. | 180/79.1 |
| 4,837,692 | 6/1989 | Shimizu | 364/424.05 |
| 4,979,114 | 12/1990 | Oshita et al. | 364/424.05 |
| 4,989,682 | 2/1991 | Takahashi et al. | 180/79.1 |

*Primary Examiner*—Gary Chin
*Attorney, Agent, or Firm*—Oblon, Spivak, McClelland, Maier & Neustadt

[57] ABSTRACT

An apparatus for controlling the ratio of a assisting force produced by a power steering system installed in an vehicle to a steering torque supplied by the driver wherein the ratio is changed by a solenoid valve arranged in the power steering system. The CPU of the apparatus changes control current to be applied to the solenoid valve using a characteristic map defining change of a base current with respect to changes of the vehicle speed and the steering angle. Further, the CPU increases the control current, when the steering wheel is returned to its neutral angle position, so as to decrease the ratio, increasing the self returning ability of the steering mechanism. The control current applied to the solenoid valve during the returning operation is changed depending upon both the steering angle and the steering speed of the steering wheel using additional characteristic maps.

6 Claims, 11 Drawing Sheets

APPARATUS FOR CONTROLLING STEERING FORCE PRODUCED BY POWER STEERING SYSTEM

BACKGROUND OF THE INVENTION

1. Field of the Invention

The present invention relates to an apparatus which has an electric control device to control the assisting force produced by a power steering system, more particularly to an apparatus capable of changing the assisting force during returning operations of the steering wheel.

2. Discussion of the Prior Art

Usually, a power steering system for a vehicle is provided with a steering shaft connected to a steering wheel, and the steering shaft is connected to the pinion shaft of the steering mechanism through an elastic member such as a torsion bar. The servo valve of the system is actuated by a relative rotation between the steering shaft and the pinion shaft to control fluid flow to and from the power cylinder, which produces an assisting force. In this system, the elastic member is twisted by a manual torque applied to the steering wheel so that the valve is operated to supply working fluid to the power cylinder. As a result, an assisting force is produced by the cylinder.

Further, such power steering system is provided with an electric control device to change the assisting force in accordance with conditions of the vehicle such as vehicle speed, steering angle, and steering speed. To improve the steering feeling, the assisting force is required to be changed during returning operations of the steering wheel. A power steering system disclosed in the Japanese Patent Laid-Open No. 62-279170 is provided with such control apparatus in which the pressure of the working fluid supplied to the reaction mechanism built in the servo valve is controlled by a solenoid throttle valve. Therefore, reaction force generated by the reaction mechanism is changed in accordance with control current applied to the solenoid throttle valve. A base control current is first determined based upon the vehicle speed and the steering angle. In addition to that, a compensation current is determined using a control map memorizing change of the compensation current with respect to change of the steering angle or the steering speed. Thus, a compensated control current, which is obtained by adding the compensation current to the base control current, is applied to the solenoid throttle valve when the steering wheel is returned to its neutral angle position. On the other hand, the base control current is applied to the solenoid throttle valve as it is when the steering wheel is turned from the neutral angle position to the right or left. With this control, the steering wheel is easily returned to its neutral angle position, improving the feeling of the steering operation.

In the embodiments, a control map defining change of the compensation current with respect to change of the steering angle and a control map defining change of the compensation current with respect to change of the steering speed is selectively used to calculate the compensation current. Therefore, the apparatus cannot change the assisting force during the returning operations in response to both of the steering angle change and the steering speed change. In the first embodiment, when the steering angle is large, the compensation current always becomes large regardless of the steering speed. In the second embodiment, when the steering speed is large, the compensation current always becomes large regardless of the steering angle. Therefore, it is difficult to give the driver a good steering feeling.

Further, in the prior apparatus, the compensation current is not determined based upon the amplitude of the base current, but determined base upon the steering angle or the steering speed. Therefore, even if the amplitude of the compensation current is the same, the amplitude ratio of the compensation current to the base current changes, causing a following disadvantage. Supposing that the base current is 0.8 ampere and the compensation current is 0.2 ampere, a control current applied to the solenoid valve is increased by 25% from 0.8 ampere to 1.0 ampere when the driver starts to return the steering wheel toward the neutral angle position. The reaction force produced by the reaction mechanism increases in accordance with the increase of the control current. On the other hand, in the event that the base current is 0.4 ampere and the compensation current is 0.2 ampere, the control current applied to the solenoid valve is increased by 50% from 0.4 ampere to 0.6 ampere, when the driver starts to return the steering wheel toward the neutral angle position. As explained above, the increase ratio of the control current is twice in the latter case as compared with the former case, even if the amplitude of the compensation current is the same. If the increase ratio becomes too high, the driver has an incongruous feeling. Therefore, it is desirable to suppress the increase ratio within a predetermined range.

Moreover, the prior apparatus, the reaction force is always increased during returning operations of the steering wheel, even if the vehicle is in conditions that the reaction force is required not to be increased. For example, the reaction force must not be increased in the event that the steering wheel is rapidly returned by the driver to avoid a danger. Therefore, the prior apparatus cannot offer appropriate control in such event. The reaction force is usually required to be increased when the vehicle is being accelerated.

SUMMARY OF THE INVENTION

Accordingly, it is a primary object of the present invention to provide an improved apparatus for controlling a steering force produced by a power steering system, which is capable of controlling assisting force during returning operations of the steering wheel in accordance with both of the steering angle and steering speed of the steering wheel, giving a satisfying steering feeling to the driver.

An additional object of the present invention is to provide an improved apparatus as set force above which is capable of changing assisting force during the returning operations in accordance with base assisting force during turning operations of the steering wheel, keeping the change ratio of the assisting force within a predetermined range.

Further object of the present invention is to provide an improved apparatus as set force above which can decrease the assisting force during returning operations only when the vehicle is being accelerated.

Briefly, the present invention provides an apparatus for controlling the steering force produced by a power steering system installed in a vehicle and equipped with a solenoid valve which varies the ratio of the assisting steering torque produced by the power steering system to the torque applied to the steering wheel by a driver according to a control current applied to the solenoid valve. The apparatus comprises a vehicle speed sensor for detecting vehicle speed, a steering angle sensor for detecting the steering angle through which the steering wheel is rotated, a steering speed detecting means for detecting the rotational speed of the steering wheel, calculation means for calculating a base control value based upon the vehicle speed detected by said vehicle speed sensor and the steering angle detected by said steering angle sensor, and compensation means for compensating the base control value based upon at least the steering angle and the steering speed. The apparatus further comprises judging means for judging whether or not the steering wheel is rotated in a returning direction approaching the neutral angle position and control means for applying to the solenoid valve a control current in accordance with the base control value calculated by the calculation means when the steering wheel is not rotated in the returning direction, and for applying to the solenoid valve a control current in accordance with the compensated based control value compensated by said compensation means when the steering wheel is rotated in the returning direction.

With this configuration, assisting force, i.e., the ratio of the assisting steering torque produced by the power steering system to the torque applied to the steering wheel by the driver is decreased when the driver returns the steering wheel to the neutral angle position. Also, the assisting force during the returning operations is controlled in accordance with both of the steering angle and the steering speed. As a result, the steering feeling can be improved in most conditions, especially, when the vehicle passes through curved roads.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 1:
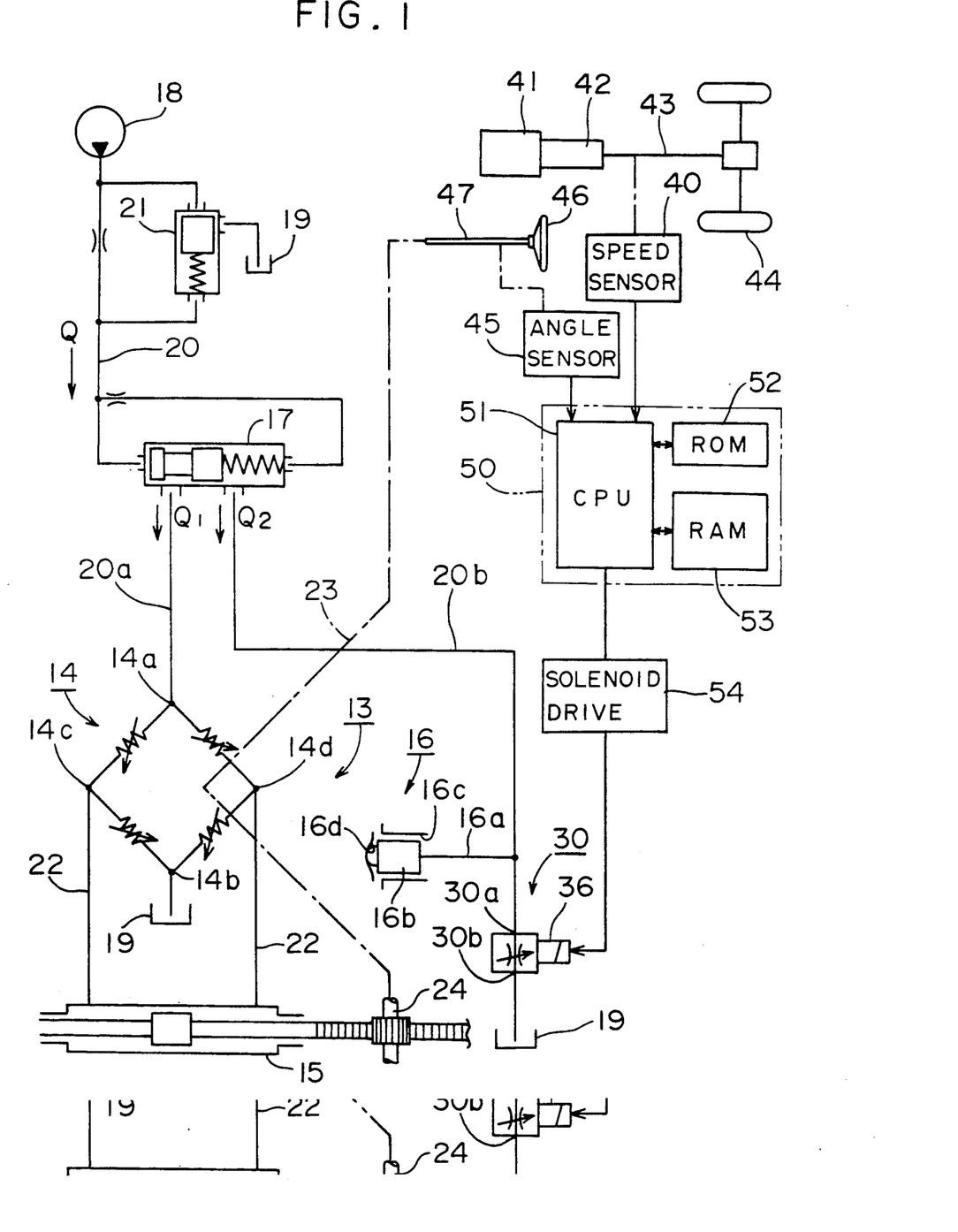
FIG. 1 is a schematic block diagram of an apparatus for controlling a power steering system according to a first embodiment of the present invention.

Referring now to the drawings and particularly, to FIG. 1 thereof, a rack-and-pinion power steering system is generally indicated by reference numeral 13. This power steering system 13 comprises a servo valve 14, a power cylinder 15, and a reaction mechanism 16 incorporated in the valve 14. This servo valve 14 is connected to the steering wheel 46 of a vehicle via an input shaft 23 and a steering shaft 47, and is connected to an output shaft 24 which is meshed with a piston rod of the cylinder 15. The piston rod is connected to the front wheels of the vehicle via a link mechanism (not shown).

A pump 18, such as a vane pump, is driven by the engine 41 of the vehicle, and incorporates a bypass valve 21 to supply working fluid at a constant flow rate Q into a flow-dividing valve 17 through a discharge passages 20. The working fluid is distributed between a servo valve passage 20a and another servo valve passage 20b at constant flow rates Q1 and Q2, respectively. The passage 20a is connected to the power cylinder 15 via the servo valve 14. The reaction mechanism 16 and a solenoid valve 30 are connected to the passage 20b.

The servo valve 14 is of the known rotary type throttle change-over valve having four ports. The servo valve 14 is mounted between the input shaft 23 and the output shaft 24 in order to be operated in response to a relative rotation between the input and output shafts 23, 24. In the event of neutral condition, the working fluid supplied to the supply port 14a flows equally to both of the right side and left side passages to produce the same low pressure at a pair of distribution ports 14c, 14d, and then flows to a reservoir 19 via a discharge port 14b. In this event, the power cylinder 15 is not operated. When the steering wheel 46 is turned by the driver, the steering effort is transmitted via the steering shaft 47 to the input shaft 23 of the servo valve 11 to actuate the valve 14. As a result, the working fluid supplied to the supply port 14a flows into one of the chambers of the cylinder 15 through one of the distribution passages 22, 22 so as to produce an assisting force, while the working fluid in the other chamber of the cylinder 15 is returned to the servo valve 14, and then returned to the reservoir 19 through the discharge port 14b. The assisting force causes the rack-and-pinion mechanism to augment its steering force output, and the augmented steering force output is transmitted to the front wheel via the link mechanism (not shown). The used working fluid is returned to the reservoir 19 and drawn again into the pump 18.

The reaction mechanism 16 is of the well known type and mainly consists of a plunger 16b and a V-shaped inclined surface 16d. The output shaft 24 of the servo valve 14 has a radially extending hole 16c in which the plunger 16b is fitted. The diametrically oppositely inclined surface 16b is formed on the input shaft 20 of the valve 14, and come into contact with the front end of the plunger 16b. Working fluid is introduced into the back of the plungers 16b through a port 16a. The pressure of this fluid is varied by the solenoid valve 30 to twist a torsion spring (not shown) to a larger or smaller extent. As a result, the operation characteristic of the servo valve 14 with respect to the manual steering torque is varied. The structure and the operation of the servo valve 14, the cylinder 15 and the reaction mechanism 16 are described in detail in U.S. Pat. No. 4,763,745, patented on Aug. 16, 1988, assigned to the assignee of the present application.

Figure 2:
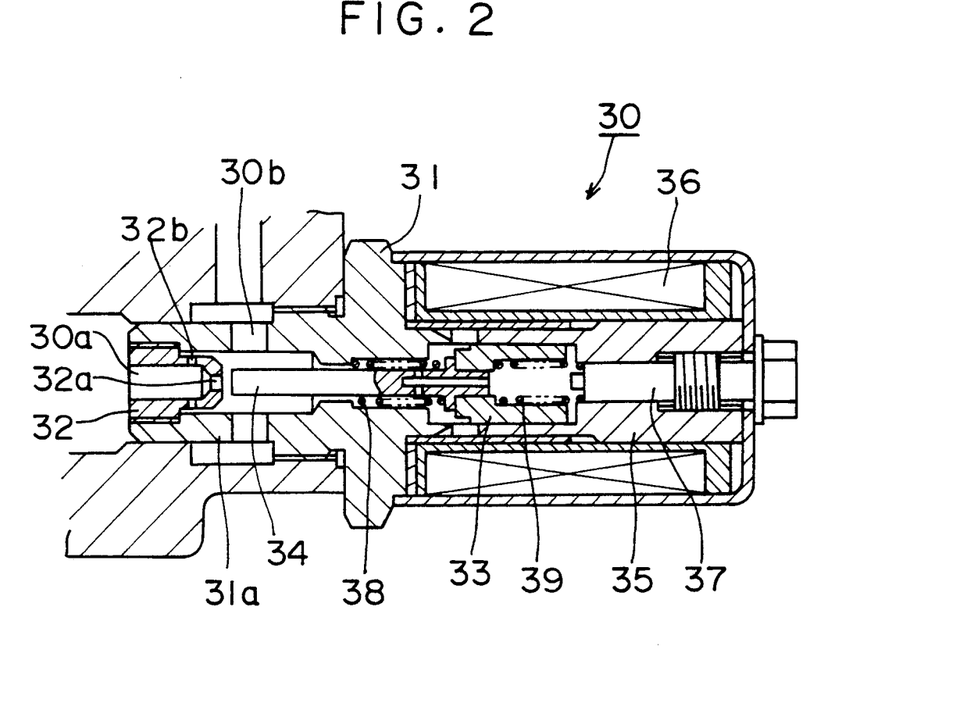
FIG. 2 is a sectional view of the solenoid valve shown in FIG. 1.

Referring to FIG. 2 illustrating the detail of the above-mentioned solenoid valve 30, a valve body 31 is formed at an end of its sleeve portion 31a with a hole (not numbered), into which threadedly fitted is a union 32 having a throttle hole 32a. A first port 30a and a second port 30b are provided to communicate with each other through the throttle hole 32a. The valve body 31 fixedly carries a yoke 36 at a side opposite to the sleeve portion 31a. A spool 33 is axially slidably received in the yoke 35. A valve rod 34 secured to the spool 33 is carried between the valve body 31 and an adjusting screw 37 threaded into the yoke 35 through a pair of springs 38 and 39. The adjusting screw 37 is adjusted in advance so that the left end of the valve rod 34 is normally spaced from the throttle hole 32a of the union 32 so as to fully open the throttle hole 32a. However, as a solenoid 36 surrounding the yoke 35 is energized, the spool 33 is displaced toward the left as viewed in FIG. 2 by an amount corresponding to the electric current applied to the solenoid 36, so as to gradually decrease the opening degree of the throttle hole 32a. The union 32 is formed with an invariable small throttle 32b which secures the communication between the ports 30a and 30b even in the state that the throttle 32a is completely closed. The solenoid valve 30 as constructed above is mounted with the sleeve portion 31a being threadedly engaged with an attaching base such as valve housing.

Referring again to FIG. 1, the electronic control apparatus 50 is primarily composed of a microcomputer (hereinafter referred to as "CPU") 51, a read-only memory (as "ROM") 52 and a random access memory (as "RAM") 53. The CPU 51 is connected to the solenoid 36 of the solenoid valve 30 via a solenoid drive circuit 54 to control the electric current applied to the solenoid 36. Also, the CPU 51 is connected to a vehicle speed sensor 40 via an interface (not shown). The sensor 40 comprises a tachometer connected to the output shaft 43 of the transmission, indicated by numeral 42, of the vehicle. The driving force of the engine, indicated by numeral 41, is transmitted to the rear wheels 44 via the transmission 42. The vehicle speed V is determined from the frequency of pulses produced by the sensor 40. The CPU 51 is also connected to a steering angle sensor 45 which comprises a rotating plate fixed to a steering shaft 47, two optical interrupters, and a phase discrimination circuit. The angle sensor 45 detects the steering angle $\theta$ through which the steering wheel 46 is turned.

Figure 3:
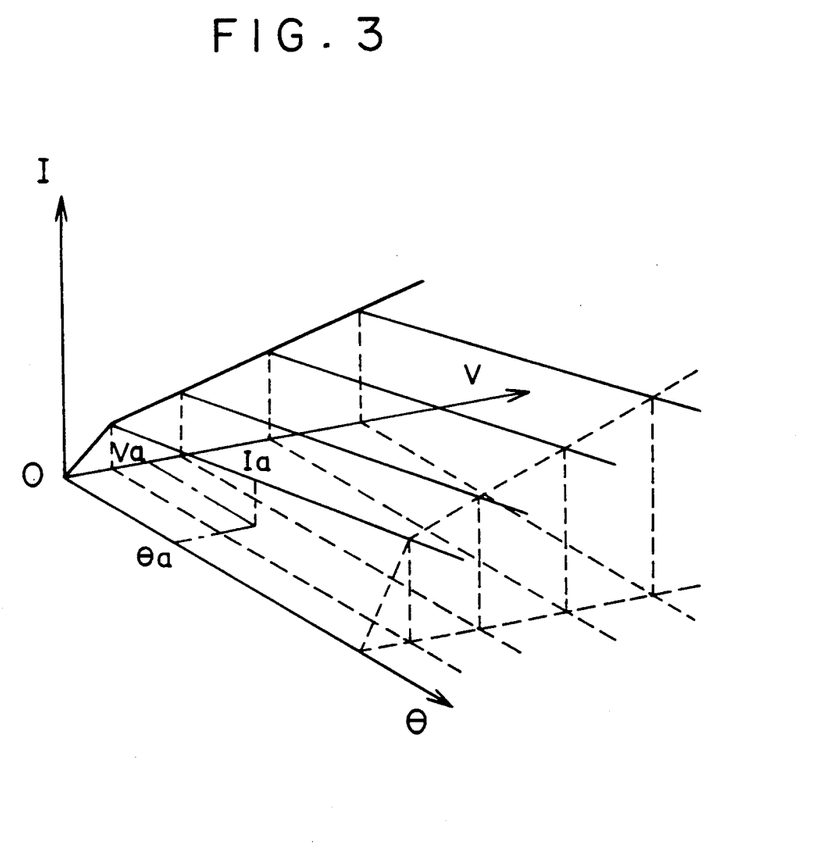
FIG. 3 is a chart illustrating a characteristic map defining change of a base current with respect to changes of steering angle $\theta$ and vehicle speed V.

The ROM 52 memorizes four characteristic maps (A) through (D). The characteristic map (A) defines change of base control current I applied to the solenoid valve 30 with respect to changes of the vehicle speed V and the steering angle $\theta$. The base current I is controlled, in accordance with the characteristic map (A), to increase in proportion to the vehicle speed V and the steering angle $\theta$, and especially to rapidly increase when the vehicle speed V is low, as shown in FIG. 3.

The characteristic map (B) defines change of return current Ir with respect to change of the vehicle speed V. The return current Ir is defined to decrease in accordance with increase of the vehicle speed V.

Figure 4:
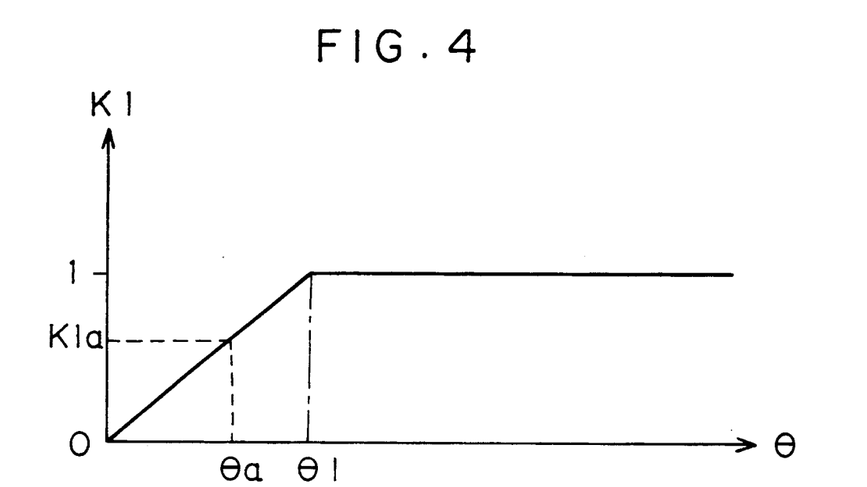
FIG. 4 is a chart illustrating a characteristic map defining change of a coefficient K1 with respect to change of steering angle $\theta$.

The characteristic map (C) defines change of a return coefficient K1 with respect to change of the steering angle $\theta$. The return coefficient K1 increases from zero to one in proportion to increase of the steering angle $\theta$ in a range wherein the steering angle $\theta$ is smaller than $\theta1$, and keeps one from the steering angle $\theta1$, as shown in FIG. 4.

Figure 5:
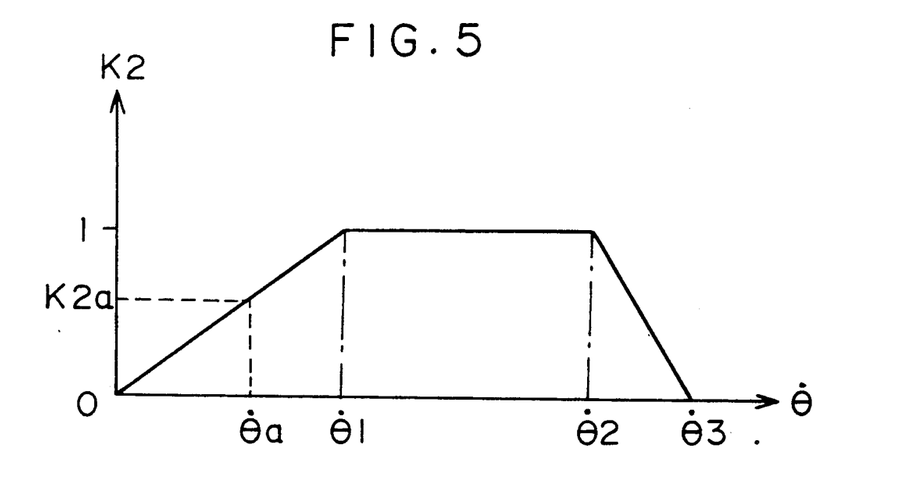
FIG. 5 is a chart illustrating a characteristic map defining change of a coefficient K2 with respect to change of steering speed $\dot{\theta}$.

The characteristic map (D) defines change of a return coefficient K2 with respect to change of the steering speed $\dot\theta$. The return coefficient K2 increases from zero to one in proportion to increase of the steering speed $\dot\theta$ in a range wherein the steering speed $\dot\theta$ is smaller than $\dot\theta1$, keeps one within a range wherein the steering speed $\dot\theta$ is between $\dot\theta1$ and $\dot\theta2$, and decreases from one to zero within a range wherein the steering speed $\dot\theta$ is between $\dot\theta2$ and $\dot\theta3$, as shown in FIG. 5.

Although the four kinds of characteristic data are memorized in the ROM 52 in the form of characteristic map, these characteristic data can be memorized in the form of experimentally obtained equation or function.

The ROM 51 also memorize a control program which is executed by the CPU 51 at a predetermined small time interval. By execution of the control program, a base current I is determined based upon the vehicle speed V and the steering angle $\theta$ detected by the vehicle speed sensor 40 and the steering angle sensor 45, respectively. Further, in the event of returning operation, a return current Ir, a return coefficient K1 corresponding to the detected steering angle $\theta$, and a return coefficient K2 corresponding to the steering speed $\dot\theta$ are obtained from the characteristic maps (C) through (D). After that, a control current is calculated based upon these values in order to apply the control current to the solenoid 36 of the solenoid valve 30.

Figure 6:
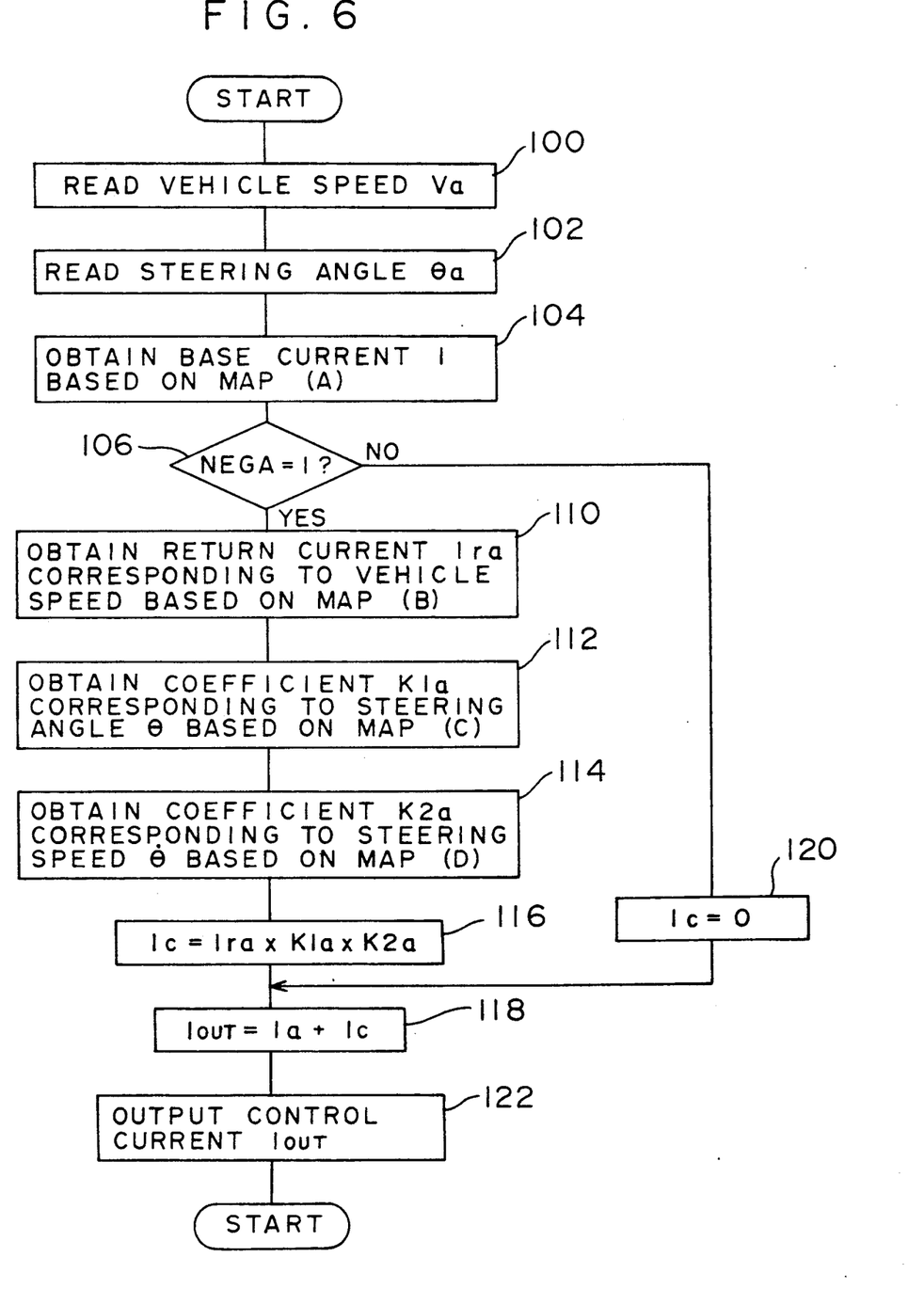
FIG. 6 is a flow chart illustrating the overall operation of the CPU shown in FIG. 1.

The operation of the electric control apparatus 50 will now be explained with reference to FIGS. 6 and 7.

When the main switch of the vehicle is turned on, the CPU 51 of the electric control apparatus 50 sets respective various variables to zero or predetermined initial values.

The vehicle speed V and the steering angle $\theta$, which change depending upon the driving condition, are detected by the vehicle speed sensor 40 and the steering angle sensor 45, and their present values Va and $\theta$a are input in registers (not shown). The CPU 51 executes the above-mentioned control program in response to interruption signal which is generated at a predetermined small time interval, for example 0.5 second.

The CPU 51 reads out, at steps 100 and 102, the present vehicle speed Va and the steering angle $\theta$a memorized in the registers, and then obtains a base control current Ia corresponding to the vehicle speed Va and the steering angle $\theta$a, at step 104. At step 106, the CPU 51 judges whether or not a returning condition detecting flag NEGA (hereinafter simply referred to as flag NEGA) is "1". As shown in FIG. 7, the flag NEGA is set to "1" when the steering wheel is rotated in a return direction approaching the neutral angle position, and is set to "0" when the steering wheel is turned to the right or left.

If NEGA is "1", the processing of the CPU moves to step 110. At the step 110, the CPU 51 obtains a return current Ira corresponding to the vehicle speed V using the characteristic map (B) (not shown). At the next step 112, the CPU 51 obtains a return coefficient K1a corresponding to the steering angle $\theta a$ read at the step 102, using the characteristic map (C) shown in FIG. 4. At step 114, the CPU 51 obtains a return coefficient K2a corresponding to the steering speed $\dot{\theta}$ calculated at step 214 of the flow chart shown in FIG. 7, using the characteristic map (D) shown in FIG. 5. At the next step 116, the CPU 51 calculates the amplitude of the compensation current Ic using the following equation.

$$Ic = Ira.K1a.K2a$$

At step 118, the CPU 51 calculate a control current $I_{OUT}$ using the following equation.

$$I_{OUT} = Ia + Ic$$

After that, the CPU 51 outputs a command signal, at step 122, to the solenoid drive circuit 54 through the interface (not shown) so as to apply the control current $I_{OUT}$ to the solenoid 36 of the solenoid valve 30. If it is detected at the step 106 that the flag NEGA is not "1", i.e., that the steering wheel is not rotated in the returning direction, the CPU 51 sets the compensation current Ic to zero at step 120. As a result, the base current Ia is applied to the solenoid 36 as the control current $I_{OUT}$. The CPU 51 repeats the processing as shown in FIG. 6 whenever interruption signal is generated.

Figure 7:
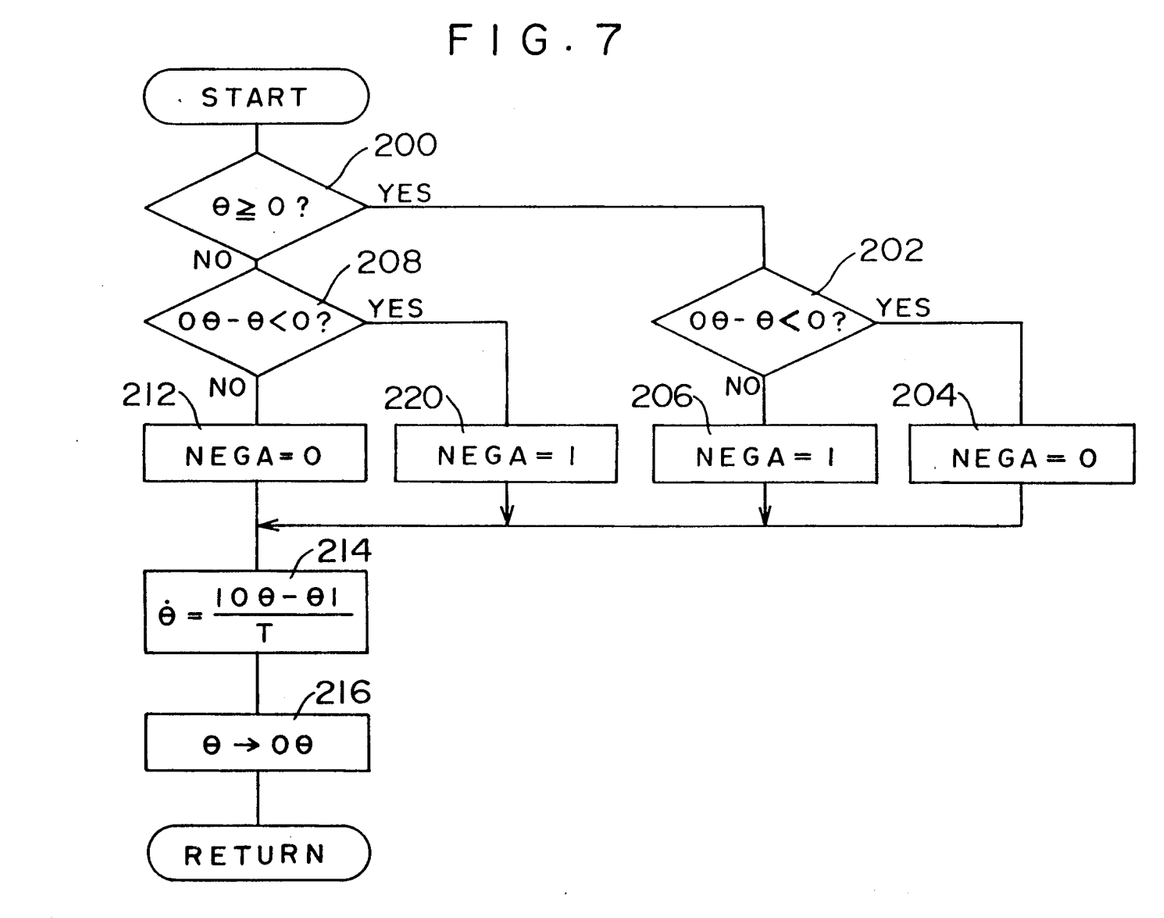
FIG. 7 is a flow chart illustrating the steering direction detecting operation of the CPU shown in FIG. 1.

FIG. 7 is a flow chart illustrating the operation of the CPU 51 for judging whether the steering wheel is rotated in returning direction.

At a first step 200, it is decided whether the steering angle $\theta$ detected by the steering angle sensor 45 is zero or larger than zero. When the steering angle $\theta$ is zero or positive, it is decided that the steering wheel 46 is turned to the right from the neutral angle position. On the contrary, when the steering angle $\theta$ is negative, it is decided that the steering wheel 46 is turned to the left. If the steering angle is zero or positive, the processing moves to step 202 to judge whether or not the inequality of $O\theta - \theta < 0$ is true. The value $O\theta$ is an old steering angle which was detected and was stored in the register in the previous processing routine. If the inequality of $O\theta - \theta < 0$ is true, i.e., the steering wheel 46 is being turned to the right, the CPU 51 sets the flag NEGA to "0" at step 204. If the inequality of $O\theta - \theta < 0$ is false, i.e., the steering wheel 46 is being returned to the neutral angle position, the CPU 51 sets the flag NEGA to "1" at step 206. Further, in the event that the steering wheel 46 is turned to the left, the flag NEGA is set to "0" or "1" in steps 212 and 220, respectively in a similar way. At following step 214, the CPU 51 calculates the change amount of the steering angle $\theta$ within the predetermined time interval, i.e., the steering speed $\dot{\theta}$ using the following equation.

$$\dot{\theta} = |O\theta - \theta|/T$$

At the next step 216, the CPU 51 memorizes a new steering angle $\theta$ into a register as old steering angle $O\theta$.

The CPU 51 executes above-mentioned processing in response to interruption signal generated at a predetermined small time interval.

As described above, in the event that the steering wheel is rotated in returning direction, the assisting force is changed depending upon both of the steering angle $\theta$ and steering speed $\dot{\theta}$. Namely, when the steering angle $\theta$ is larger than the predetermined steering angle $\theta 1$ and the steering speed $\dot{\theta}$ is between the predetermined steering speeds $\dot{\theta}1$ and $\dot{\theta}2$, the compensation current Ic becomes the maximum value equal to the return current Ir, because the coefficients K1a and K2a are one. Therefore, the assisting force during returning operations becomes small, improving the self returning ability of the steering mechanism, which returns the front tires to the neutral angle position. As a result, the steering feeling in such returning operation can be improved.

Further, in the event that the steering wheel 46 is located close to the neutral angle position, i.e., the steering angle $\theta$ is smaller than the predetermined angle $\theta 1$, the compensation current Ic becomes smaller, so that the assisting force is decreased by a smaller amount as compared with the above-mentioned condition. Therefore, the assisting force is not decreased so much during the returning operation, when the steering wheel 46 is returned from an angle position close to the neutral position. Also, in the event that the steering speed $\dot{\theta}$ is smaller than $\dot{\theta}1$ or larger than $\dot{\theta}2$, the compensation current Ic becomes smaller, so that the assisting force is decreased by a smaller amount as compared with the above-mentioned condition. Therefore, the assisting force is not decreased so much during the returning operation, when the steering wheel 46 is returned slowly, or is returned very quickly. With this control, the steering feeling during the returning operation can be improved regardless of the returning speed of the steering wheel 46.

As explained above, the control apparatus according to the present invention can change the steering force in accordance with both of the steering angle $\theta$ and steering speed $\dot{\theta}$, improving the steering feeling.

Figure 8:
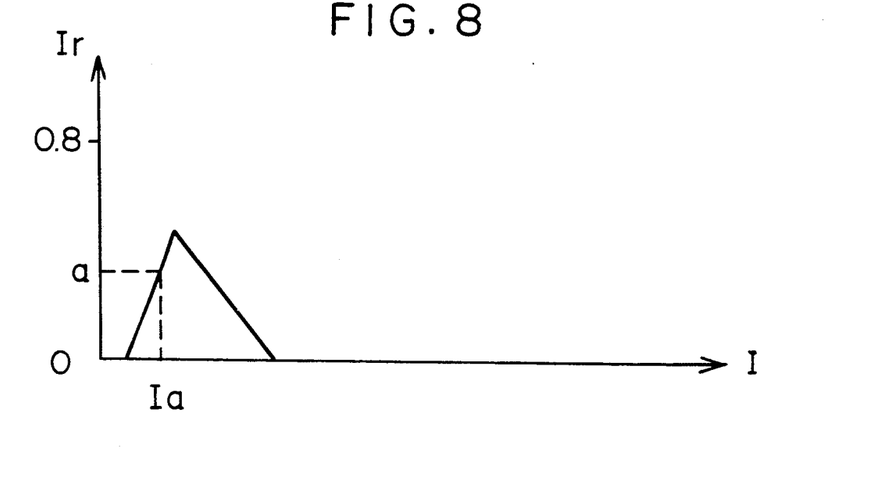
FIG. 8 is a chart illustrating a characteristic map defining change of a return current Ir with respect to change of the base current I according to a second embodiment of the present invention.
Figure 9:
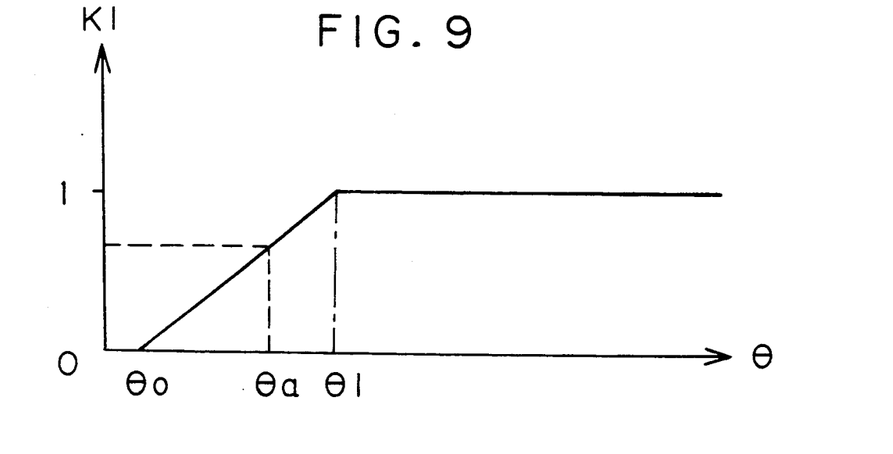
FIG. 9 is a chart illustrating a characteristic map defining change of a coefficient K1 with respect to change of steering angle $\theta$ according to the second embodiment.
Figure 10:
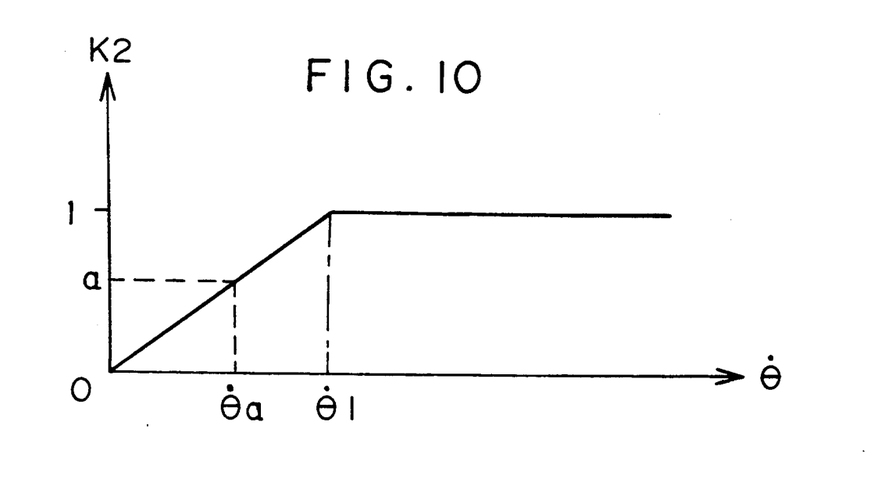
FIG. 10 is a chart illustrating a characteristic map defining change of a coefficient K2 with respect to change of steering speed $\dot{\theta}$ according to the second embodiment.
Figure 11:
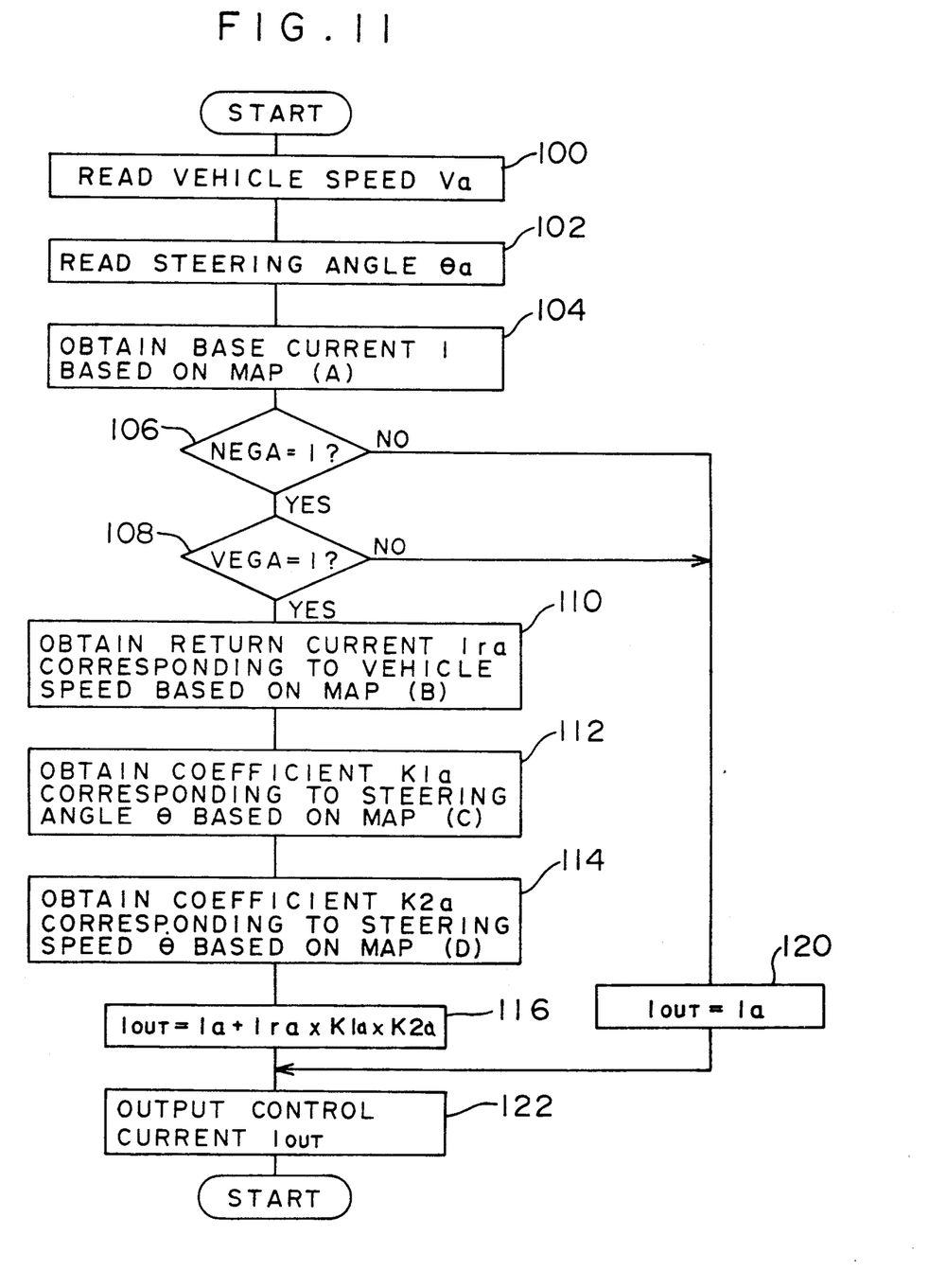
FIG. 11 is a flow chart illustrating the operation of the CPU shown in FIG. 1 according to the second embodiment.

FIGS. 8 through 12 show characteristic maps and flow charts in accordance with a second embodiment of the present invention. While the characteristic map (A) used in the first embodiment is also used in the second embodiment, the characteristic maps (B), (C) and (D) are different from those of the first embodiment. Namely, the characteristic map (B) defines change of the returning current Ir with respect to change of the base current I, as shown in FIG. 8. The return current Ir is defined to increase from zero to a predetermine maximum current in accordance with increase of the base current I when the base current I is smaller than a predetermined current, and to decrease from the maximum current to zero in accordance with increase of the base current I when the base current I is larger than the predetermined current. The return coefficient K1 defined by the characteristic map (B) is similar to that of the first embodiment, but the return coefficient K1 starts to increase at predetermined steering angle $\theta 0$. Also, the return coefficient K2 defined by the characteristic map (D) is similar to that of the first embodiment, but the return coefficient K2 is defined to be one when the steering speed $\dot{\theta}$ is larger than the predetermined steering speed $\dot{\theta}1$. The characteristic map (D) used in the first embodiment can also be used in the second embodiment instead of the characteristic map shown in FIG. 10.

Figure 12:
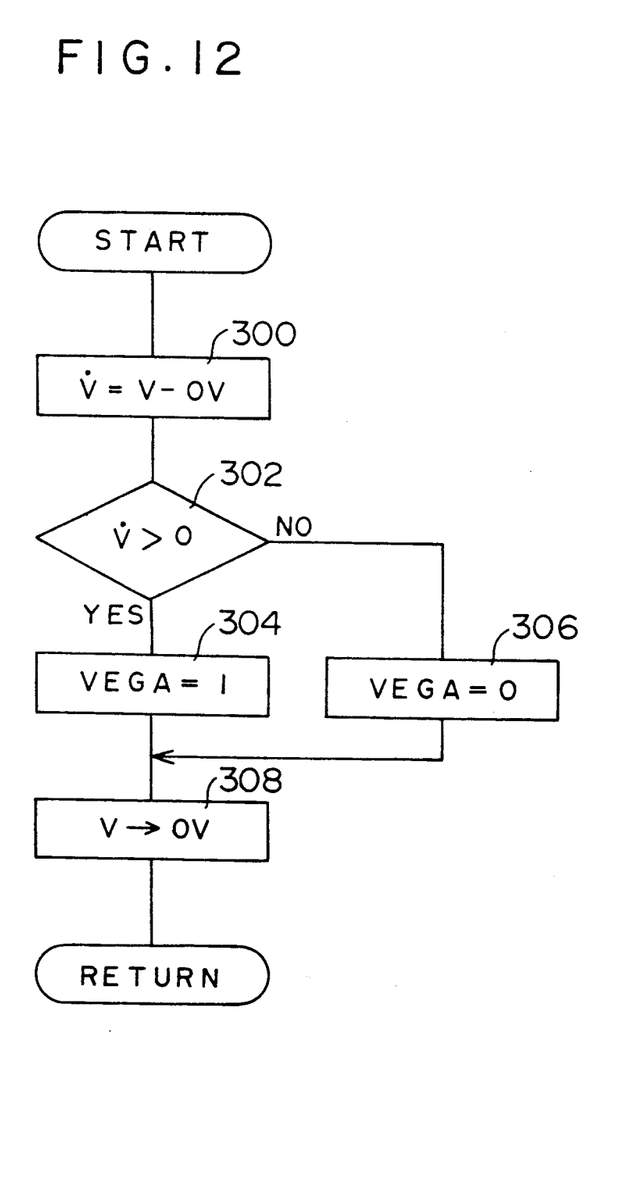
FIG. 12 is a flow chart illustrating the detail operation of the CPU shown in FIG. 1 for detecting whether vehicle is being accelerated.

The processing of the CPU 51 is similar to that of the first embodiment, but processing at step 108 is added so as to execute processing at steps 110 through 116 only when the the vehicle is being accelerated. At the step 108, the CPU 51 judges whether or not the state of an acceleration condition detecting flag VEGA (hereinafter simply referred as flag VEGA) is "1". As shown in FIG. 12, the flag VEGA is set to "1" when the vehicle is in acceleration state, while is set to "0" when the vehicle is in deceleration state.

FIG. 12 is a flow chart illustrating the operation of the CPU 51 for judging whether or not the vehicle is in acceleration state. At first, the CPU 51 calculates, at step 300, a difference between a new vehicle speed V detected by the vehicle speed sensor 40 and an old vehicle speed OV detected and memorized in the register in the previous processing routine in order to calculate the change amount of the vehicle speed within the predetermined small time interval, i.e., the acceleration $\dot{V}$ of the vehicle. At the next step 302, the CPU 51 judges whether or not the acceleration $\dot{V}$ is positive. If the acceleration $\dot{V}$ is positive, i.e., the vehicle is in acceleration state, the CPU 51 sets the flag VEGA to "1" at step 304. If the acceleration $\dot{V}$ is zero or negative, the CPU 51 set the flag VEGA to "0" at step 306. At the next step 308, the vehicle speed V newly detected is memorized in the register as old vehicle speed OV. The CPU 51 executes above-mentioned processing in response to interruption signal generated at a predetermined small time interval.

When the flag NEGA is "1", i.e., the vehicle is being accelerated, the processing of the CPU 51 moves from step 108 to step 110 so as to execute the processing of the steering force control during returning operations.

Further, in the second embodiment, the processing in the steps 120 and 122 are different from that of the first embodiment. Namely, when the flag NEGA is not "1" and the flag VEGA is not "1", the base current Ia is treated as the control current $I_{OUT}$ at step 120, and the control current $I_{OUT}$ is applied to the solenoid 36 at step 122.

In the second embodiment, the assisting force is decreased during returning operations only when the vehicle is being accelerated, and is not decreased when the vehicle is being decelerated. Therefore, the assisting force is decreased so as to improve the self returning ability of the steering mechanism, in such an event that the vehicle is accelerated after the vehicle has passed the mid point of a curved road. In such event, the driver easily returns the steering wheel 46, because the self returning ability of the steering mechanism helps the driver to return the steering wheel to the neutral angle position.

On the contrary, the assisting force is not decreased in such an event that the driver faces a danger and decelerates the vehicle. In such event, the driver can turns the steering wheel 46 very quickly to avoid the danger, because the assisting force is kept to be high even when the steering wheel 46 is returned to the neutral angle position.

Figure 13:
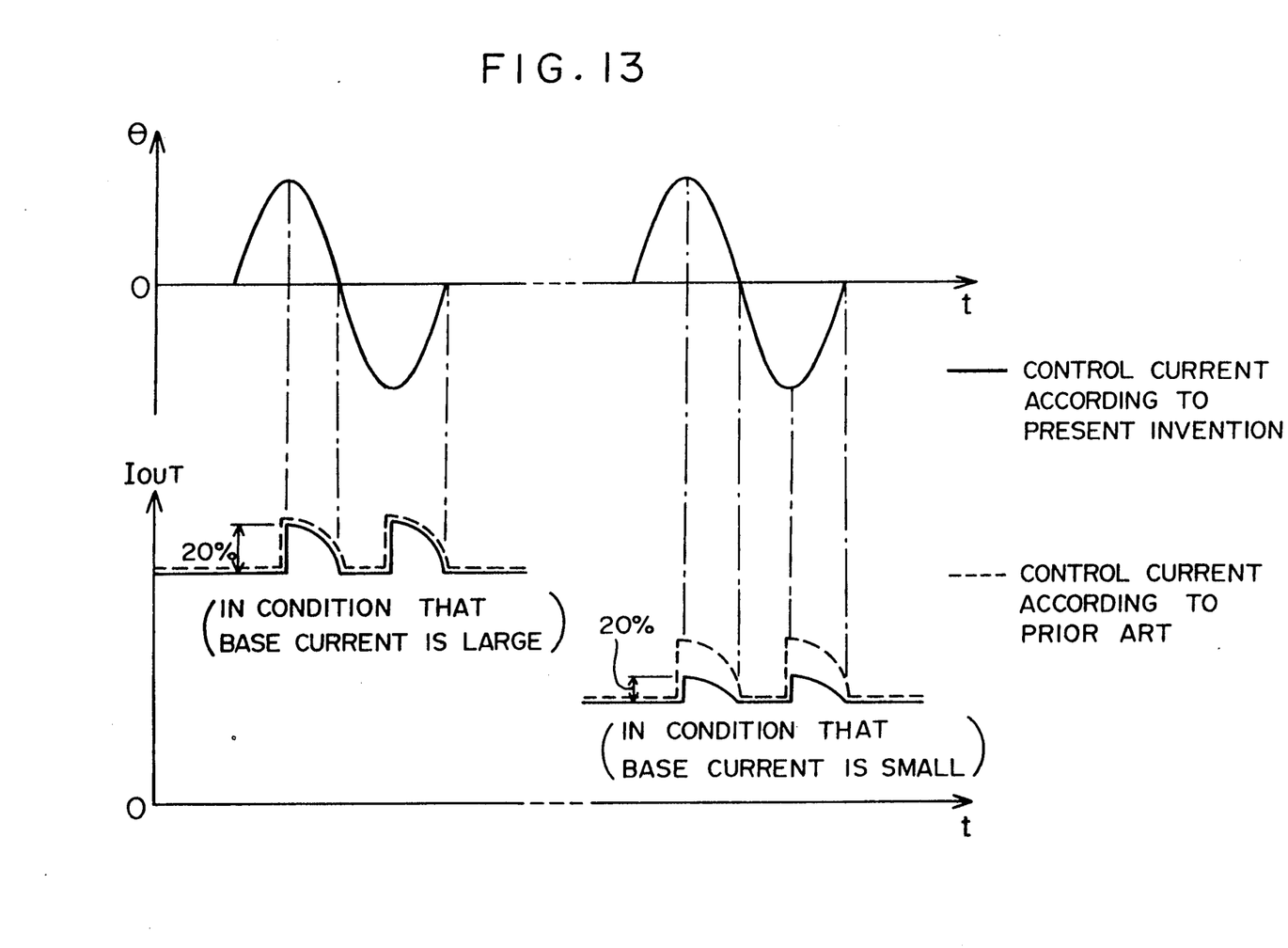
FIG. 13 is a chart illustrating relationship between change of the steering angle and the change of the control current.

Further, since the return current Ir is changed in accordance with change of the base current I, the amplitude of the control current $I_{OUT}$ changes depending on the the base current I and the return current Ir, as well as the steering angle $\theta$ and the steering speed $\dot{\theta}$, as shown in FIG. 13.

As is understood from FIG. 13, the control current $I_{OUT}$ becomes large during returning operations as compared with the turning operations, and the increase amount of the control current $I_{OUT}$ during the returning operations becomes smaller in proportion to decrease of the base current I.

Therefore, assuming that the steering angle $\theta$, and the steering speed $\dot{\theta}$ is the same, the control current $I_{OUT}$ increases by the same ratio (for example, 20%) when the steering operation changes from turning operation to returning operation regardless of the amplitude of the base current. Since the assisting force decreases in accordance with the increase of the control current $I_{OUT}$, the assisting force changes by the same rate when the steering operation changes from turning operation to returning operation regardless of the amplitude of the base current. As a result, the power steering system can suppress the change ratio of the assisting force within a predetermined range, preventing the driver from having an incongruous feeling in returning operations.

Although, in the above mentioned embodiment, the return current Ir is first calculated based upon the base current I and the control current $I_{OUT}$ is thereafter calculated based upon the base current I, return current Ir and return coefficients K1 and K2, the control current $I_{OUT}$ can directly be calculated based upon the base current I and the return coefficients K1 and K2.

Figure 14:
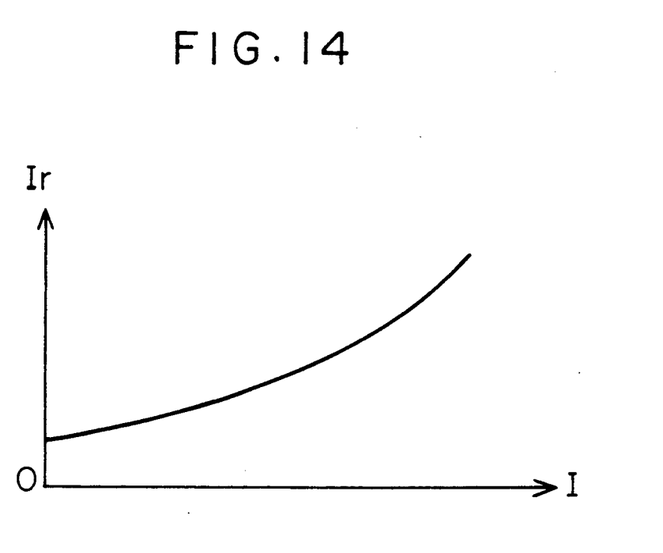
FIG. 14 is a chart illustrating a characteristic map defining change of return current I with respect to change of the base current I according to another embodiment.

Further, a characteristic map shown in FIG. 14 can be used as the characteristic map (B), which defines change of the return current Ir.

In the second embodiment, the assisting force is changed only when the vehicle is in acceleration conditions, but the control current $I_{OUT}$ is not changed based upon the degree of the acceleration. It is possible that the control current $I_{OUT}$ is changed based upon the degree of the acceleration. Also, the accelerations state can be detected based upon the angle position of the accelerator pedal of the vehicle.

Although the assisting force is changed by controlling the current applied to the solenoid valve 30, which controls amount of working fluid applied to the reaction mechanism 13, the present invention can be applied to other type of power steering system which is provided with a solenoid-controlled variable bypass valve connected between the high pressure chamber and the low pressure chamber of the power cylinder so as to control the steering force. In such case, the current applied to the variable bypass valve is controlled by the above-mentioned electric control apparatus 50.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for controlling steering force produced by a power steering system installed in a vehicle and equipped with a solenoid valve which varies the ratio of an assisting steering torque produced by the power steering system to a torque applied to a steering wheel by a driver according to a control current applied to the solenoid valve, said apparatus comprising:
a vehicle speed sensor for detecting vehicle speed;
a steering angle sensor for detecting a steering angle through which the steering wheel is rotated;
a steering speed detecting means for detecting rotational speed of the steering wheel;

calculation means for calculating a base control value based upon the vehicle speed detected by said vehicle speed sensor and the steering angle detected by said steering angle sensor;

compensation means for compensating the base control value based upon at least the steering angle and the steering speed;

judging means for judging whether or not the steering wheel is rotated in a returning direction approaching a neutral angle position;

control means for applying to the solenoid valve an electric current corresponding to the base control value calculated by said calculation means when the steering wheel is not rotated in the returning direction, and for applying to the solenoid valve an electric current corresponding to the compensated base control value compensated by said compensation means when the steering wheel is rotated in the returning direction.

2. An apparatus as set forth in claim 1, wherein said calculation means comprises:

memory means for memorizing first characteristic data defining change of the base control value with respect to changes of the vehicle speed and the steering angle, and wherein said calculation means calculates the base control value corresponding to the detected vehicle speed and steering angle using said first characteristic data.

3. An apparatus as set forth in claim 2, wherein said compensation means comprises:

memory means for memorizing second characteristic data defining change of a return control value with respect to change of the vehicle speed, third characteristic data defining change of a first coefficient with respect to change of the steering angle and fourth characteristic data defining change of a second coefficient with respect to change of the steering speed; and wherein said compensation means obtains a return control value, a first coefficient and a second coefficient corresponding to the detected vehicle speed, steering angle and steering speed using said second, third and fourth characteristic data, respectively, and calculates a compensation value based on the obtained return control value, first coefficient and second coefficient, and calculates the compensated base control value by adding the compensation value to the base control value.

4. An apparatus as set forth in claim 2, wherein said compensation means comprises:

memory means for memorizing second characteristic data defining change of a return control value with respect to change of the base control value, third characteristic data defining change of a first coefficient with respect to change of the steering angle and fourth characteristic data defining change of a second coefficient with respect to change of the steering speed; and wherein said compensation means obtains a return control value, a first coefficient and a second coefficient corresponding to the base control value, detected steering angle and steering speed using said second, third and fourth characteristic data, respectively, and calculates a compensation value based on the obtained return control value, first coefficient and second coefficient, and calculates the compensated base control value by adding the compensation value to the base control value.

5. An apparatus as set forth in claim 2, wherein said compensation means comprises:

memory means for memorizing second characteristic data defining change of a first coefficient with respect to change of the steering angle and third characteristic data defining change of a second coefficient with respect to change of the steering speed, wherein said compensation means obtains a first coefficient and a second coefficient corresponding to the detected steering angle and steering speed using said second and third characteristic data, respectively, and calculates said compensated base control value based on the base control value, first coefficient and second coefficient.

6. An apparatus as set forth in claim 1, wherein said control means further comprises acceleration detection means for calculating acceleration of the vehicle and additional judging means for judging whether or not the vehicle is being accelerated, and applies to the solenoid valve said electric current in accordance with the compensated base control value compensated by said compensation means when the steering wheel is rotated in the returning direction and the vehicle is being accelerated.

* * * * *